P. CONNIFF.
PIPE COUPLING.
APPLICATION FILED FEB. 1, 1916.
1,201,022.
Patented Oct. 10, 1916.
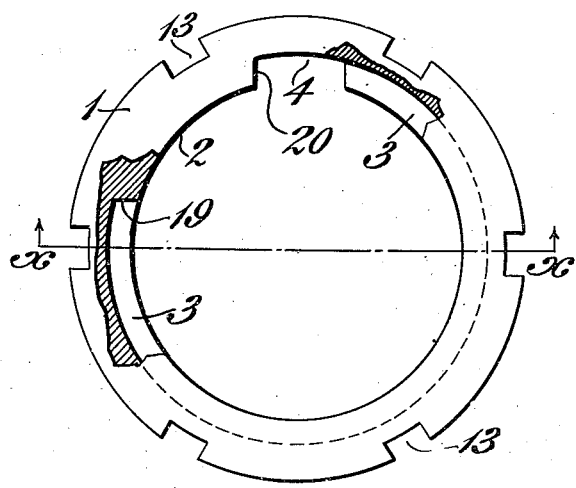
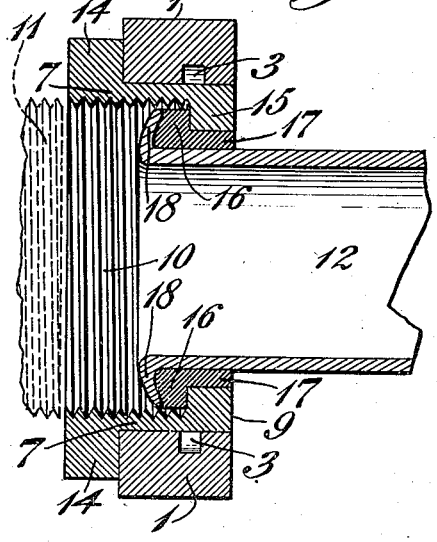
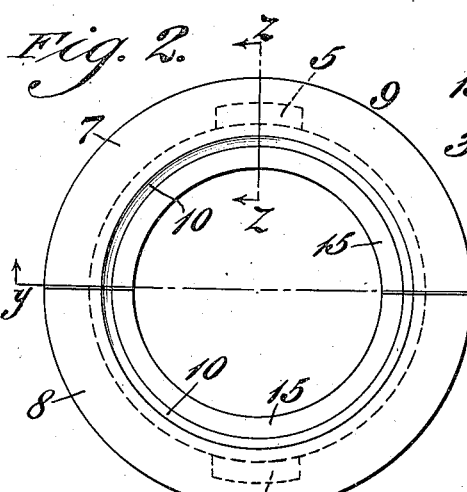
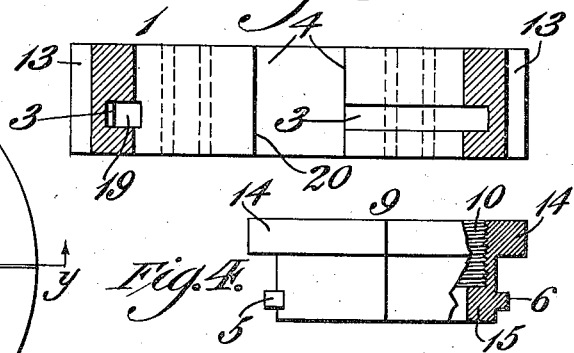
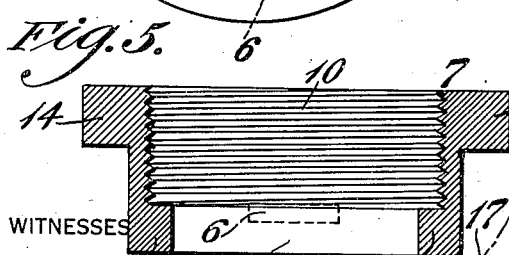
WITNESSES
L. Douville,
H. T. Dieterich
INVENTOR
Philip Conniff
BY Niedersheim Fairbanks
ATTORNEYS

UNITED STATES PATENT OFFICE.

PHILIP CONNIFF, OF BALTIMORE, MARYLAND.

PIPE-COUPLING.

1,201,022.  Specification of Letters Patent.  Patented Oct. 10, 1916.

Application filed February 1, 1916. Serial No. 75,489.

*To all whom it may concern:*

Be it known that I, PHILIP CONNIFF, a citizen of the United States, residing in the city of Baltimore, State of Maryland, have invented a new and useful Pipe-Coupling, of which the following is a specification.

My invention consists of a novel pipe coupling, wherein the parts are interlocked and wherein provision is made for effecting the coupling or uncoupling action by the rotation of an outer member.

Other novel features of construction and advantage will hereinafter appear in the detailed description of my invention.

For the purpose of illustrating my invention, I have shown in the accompanying drawings one form thereof which is at present preferred by me, since the same will give in practice satisfactory and reliable results, although it is to be understood that the various instrumentalities of which my invention consists can be variously arranged and organized and that my invention is not limited to the precise arrangement and organization of these instrumentalities as herein shown and described except as defined by the scope of the appended claims.

Figure 1 is a plan view of a ring employed in connection with a coupling embodying my invention. Fig. 2 is a plan view of a nut or thimble employed. Fig. 3 is a vertical section on line $x$—$x$ in Fig. 1. Fig. 4 is a front elevation of the nut or thimble seen in Fig. 2, partly broken away and on a reduced scale. Fig. 5 is a vertical section on line $y$—$y$ in Fig. 2. Fig. 6 is a perspective view of the several parts of the coupling separated from each other and on a reduced scale. Fig. 7 is a sectional elevation of a pipe coupling embodying my invention.

Similar numerals of reference indicate corresponding parts in the figures.

Referring to the drawings:—1 designates a locking ring whose inner wall 2 is provided with an inner peripheral groove 3 which extends from a groove 4 to somewhat more than three-fourths of the circumference of the inner circle of said ring, it being noted that said groove 4 is at a right angle to the groove 3, into which it leads, and that it extends the entire thickness of said ring, so that it is open at both ends. The grooves 3 and 4 are adapted to receive the lugs 5 and 6 that project from the periphery of the sections 7 and 8, respectively, of a coupling sleeve or thimble 9.

It will be understood from Figs. 2 and 6 that the members 7 and 8, in the present instance, form a sectional coupling sleeve, so that when the sections are placed together, as seen in Fig. 2, they form a complete sleeve.

The sleeve 9 is internally screw-threaded, as at 10, so as to engage the screw threads 11 on the end of a pipe to be coupled to the pipe 12.

The periphery of the ring 1 is provided with grooves 13 adapted to receive a spanner or other tool for turning the ring 1, so as to either couple to or uncouple from the pipe 12. The sleeve 9 is provided with an exterior flange 14 at one end, that abuts against the ring 1 when the several parts are assembled.

The sleeve 9 is provided at its opposite end with an inwardly extending flange 15 that coöperates with a flange 16 of an annular bushing 17 secured to the pipe 12 in any desired manner.

It will be noted, on referring to Fig. 2, that the end of the pipe 12 is swaged or bent outwardly, as at 18, so as to firmly secure the pipe 12 and ring 17 together, and also form a tight joint between the pipes to be coupled.

The manner of assembling the parts of the coupling together is as follows:—The section 8 of the sleeve 9, (see Fig. 6), is so placed with respect to the ring 1, that its lug 6 is in alinement with the slot 4 in said ring 1. The member 8 is then inserted in the bore of the ring 1 and is moved rearwardly until the lug 6 registers with the groove 3 in the ring 1. The member 8 is then given a half turn, within the bore of the ring 1, so as to leave an open space in the groove 3 for the reception of the section 7 of the sleeve 9 which is so located with respect to the ring 1 that its lug 5 is in alinement with the groove 4, after which the manner of connecting the member 7 with the ring 1 is similar to that described in connection with the member 8. The ring 1 and the sleeve 9, fitted therein, are then slipped upon the pipe 12 and are brought up to the ring 17, as seen in Fig. 7, so that the flanges 15 and 16 abut against each other.

When two sections of pipe are to be coupled together, the ring 1 is turned in the usual direction so that the threads 10 of the sleeve 9 engage with the threads 11 of the adjacent pipe and thus draw or tighten both pipes together.

It will be observed that when the ring 1 is turned in one direction, the lug 5 on the member 7 abuts against the shoulder 19 in said ring and causes both the ring 1 and the thimble 9 to turn in unison, while on the other hand, when the ring 1 is turned in an opposite direction, the lug 6 on the member 8 abuts against the wall 20 of the groove 4, in the ring 1, and causes said ring 1 and the thimble 9 to turn in unison whereby the sections of pipes may be either coupled or uncoupled as desired.

It will be seen that in accordance with my present invention, I provide a split sleeve having means to engage juxtaposed ends of pipes to draw them toward each other and couple them together and the sleeve is provided with means to interlock with the ring, and the parts are constructed in such a manner that after a predetermined rotation of the ring in either direction the sleeve rotates in unison therewith.

It will now be apparent that I have devised a novel and useful construction of a pipe coupling which embodies the features of advantage enumerated as desirable in the statement of the invention and the above description, and while I have, in the present instance, shown and described preferred embodiments thereof which will give in practice satisfactory and reliable results, it is to be understood that the same are susceptible of modification in various particulars within the scope of the appended claims without departing from the spirit or scope of the invention or sacrificing any of its advantages.

Having thus described my invention, what I claim as new and desire to secure by Letters Patent, is:—

1. In a pipe coupling, a sectional sleeve, a ring rotatable on said sleeve, said sleeve and ring having means to interlock on their relative rotation in either direction to cause them to rotate in unison, and said sleeve having means to engage juxtaposed ends of pipes.

2. In a pipe coupling, a sectional sleeve, and a ring rotatably mounted on the sleeve and provided with an inner peripheral groove, the sections of said sleeve having means to engage said groove and interlock with said ring on a predetermined rotation of the latter, and said sleeve having means to engage juxtaposed pipe ends to couple them together.

3. In a pipe coupling, a sectional sleeve having an exterior flange at one end, an inwardly extending flange at its other end, a lug on each sleeve, and having its inner periphery threaded, and a ring rotatable on said sleeve and having an inner peripheral groove and a slot communicating with said groove to receive said lugs, said groove and slot forming shoulders with which said lugs engage to effect the rotation of said sleeve.

PHILIP CONNIFF.

Witnesses:
JOHN T. HAGGERTY, Jr.,
CHAS. A. JONES.